US005579633A

United States Patent [19]
Hunter, Jr. et al.

[11] Patent Number: 5,579,633
[45] Date of Patent: Dec. 3, 1996

[54] ANNULAR PULSE DETONATION APPARATUS AND METHOD

[75] Inventors: Louis G. Hunter, Jr., Fort Worth; Don D. Winfree, Keller, both of Tex.

[73] Assignee: Lockheed Martin Corporation, Fort Worth, Tex.

[21] Appl. No.: 265,384

[22] Filed: Jun. 24, 1994

[51] Int. Cl.$^6$ ........................................ F02K 7/02
[52] U.S. Cl. ..................... 60/204; 60/247; 60/39.78
[58] Field of Search ..................... 60/39.36, 39.38, 60/39.39, 39.40, 39.76, 39.78, 39.79, 39.8, 39.81, 247, 248, 39.06, 204; 431/1, 174, 176, 178, 179, 180, 280

[56] References Cited

U.S. PATENT DOCUMENTS

| | | | |
|---|---|---|---|
| 2,557,198 | 6/1951 | Nichols | 60/39.39 |
| 2,930,196 | 3/1960 | Hertzberg et al. | 60/39.76 |
| 3,634,778 | 1/1972 | Melikian et al. | |
| 3,812,783 | 5/1974 | Yang et al. | |
| 4,741,154 | 5/1988 | Eidelman | |
| 4,870,903 | 10/1989 | Carel et al. | |
| 5,280,705 | 1/1994 | Epstein et al. | 60/247 |
| 5,345,758 | 9/1994 | Bussing | 60/39.76 |
| 5,361,581 | 11/1994 | Clark | 60/247 |

OTHER PUBLICATIONS

T. Bussing and G. Pappas, "An Introduction to Pulse Detonation Engines," 32nd Aerospace Sciences Meeting & Exhibit, Jan. 10–13, 1994 (14 pages).

*Primary Examiner*—Louis J. Casaregola
*Attorney, Agent, or Firm*—James E. Bradley

[57] ABSTRACT

A pulse detonation apparatus utilizes a rotatable core feed cylinder. The core feed cylinder is carried within a inner sidewall of a stationary annular detonation chamber. The core feed cylinder has ports in the sidewall that will register with ports in the inner sidewall of the annular detonation chamber at least once each revolution. A fuel valve means mounted to the outer sidewall of the annular detonation chamber supplies pulses of gaseous fuel. The oxygen content at the forward end of the detonation chamber is richer than toward the rearward end. The fuel is ignited to create a detonation wave. A purge gas flowing through the core feed cylinder enters the detonation cavity after the detonation wave has discharge for purging.

22 Claims, 3 Drawing Sheets

ANNULAR PULSE DETONATION APPARATUS AND METHOD

CROSS REFERENCE TO RELATED APPLICATION

This application is being filed simultaneously with another application by the same inventors entitled PULSE DETONATION ENGINE.

BACKGROUND OF THE INVENTION

1. Field of the Invention

This invention relates in general to devices for discharging high pressure exhaust, and in particular to pulse detonation engines.

2. Summary of the Prior Art

A pulse detonation engine is an apparatus which produces a high pressure exhaust from a series of repetitive detonations within a detonation chamber. The process is a constant volume heat addition process. A gaseous fuel is detonated within a chamber, causing a pulse detonation wave which propagates at supersonic speeds. The detonation wave compresses the fluid within the chamber, increasing its pressure, density and temperature. As the detonation wave passes out the open rearward end, thrust is created. The cycle is then repeated.

Although theoretically desirable for aircraft, to applicant's knowledge there are no pulse detonation engines being commercially used at this time. The reason may be the problems resulting from very high detonation chamber temperatures, approximately 4,000° F. Also, initiating the repetitive detonations is a problem.

Another prior art engine, known as a pulse jet engine, was employed in World War II on aircraft. That engine cycle relied on slow moving deflagration, not detonation. The deflagration waves are subsonic, not supersonic waves. A pulse jet engine is not a pulse detonation engine.

SUMMARY OF THE INVENTION

The pulse detonation apparatus of this invention has a core feed cylinder with a forward wall having an inlet port. The core feed cylinder has an outlet port in the sidewall. The core feed cylinder is carried rotatably inside an annular detonation chamber. The detonation chamber has an inner sidewall with a chamber port that registers with the outlet port of the core feed cylinder at least once per revolution. The detonation chamber has an outer sidewall spaced radially outward and concentric with the inner sidewall, defining a detonation cavity. An external valve assembly mounts to the outer sidewall of the detonation chamber.

Oxygen and a fuel such as hydrogen or propane are introduced to the detonation chamber at the forward end of the detonation chamber. Air and fuel may also be admitted through the external valve assembly to the detonation chamber, downstream from the point at which the oxygen and fuel are injected. The oxygen fuel is ignited to create a detonation wave, which also creates a reverberating or expansion wave. The detonation wave propagates the air fuel mixture and passes out the open rearward end of the detonation chamber at supersonic speeds. The expansion wave, also considered a detonation wave herein, reflects off the forward wall of the cavity and discharges out the rearward end, creating additional thrust.

The core feed cylinder is rotated relative to the detonation chamber during operation. In one embodiment, a purge gas such as air flows into the core feed cylinder. Once the expansion wave has passed out the rearward end of the detonation chamber, the purge gas flows out the outlet port of the core feed cylinder into the detonation cavity. The purge gas purges the detonation chamber of burned gases.

DETAILED DESCRIPTION OF THE INVENTION

Figure 1:
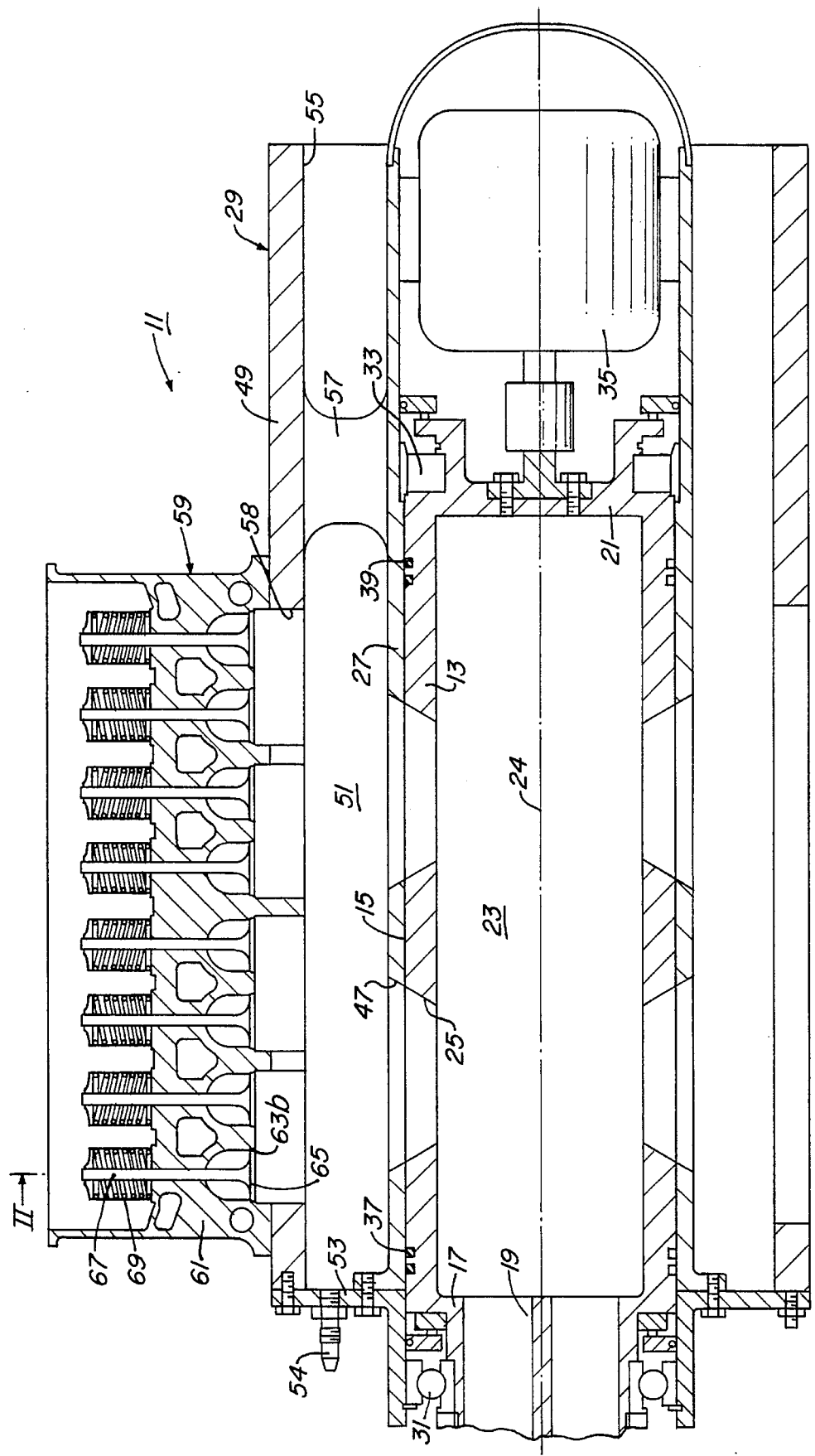
FIG. 1 is a vertical sectional view illustrating a pulse detonation apparatus constructed in accordance with this invention.

Referring to FIG. 1, pulse detonation apparatus 11 has a core feed cylinder 13. Core feed cylinder 13 is a cylindrical member having a cylindrical sidewall 15 and a forward end 17. A plurality of inlet ports 19 extend through forward end 17. Inlet ports 19 are preferably connected to a purge gas, such as ambient air. Core feed cylinder 13 has a rearward end 21 that is closed, defining a cylindrical cavity 23 located on a longitudinal axis 24.

There are four core feed cylinder outlet ports 25 formed in sidewall 15. Each core feed cylinder outlet port 25 is circular and of the same dimension in the embodiment shown. The more forward two of the core feed cylinder outlet ports 25 are spaced the same distance from forward end 17 and located 180 degrees from each other. The more rearward core feed cylinder outlet ports 25 are spaced rearward of the forward two and also located 180 degrees from each other.

Core feed cylinder 13 is carried rotatably inside an inner sidewall 27 of an annular detonation chamber 29. Core feed cylinder 13 is supported by a forward set of bearings 31 and a rearward set of bearings 33. A motor 35, shown at the rearward end 21, is mounted to inner sidewall 27 and rotates core feed cylinder 13 relative to inner sidewall 27.

A pair of forward circular seals 37 and rearward circular seals 39 seal between core feed cylinder 13 and inner sidewall 27. Circular seals 37, 39 are perpendicular to axis 24. The forward seals 37 are located forward of the core feed cylinder outlet port 25 while the rearward circular seals 39 are located rearward out of the core feed cylinder outlet ports 25.

Figure 2:
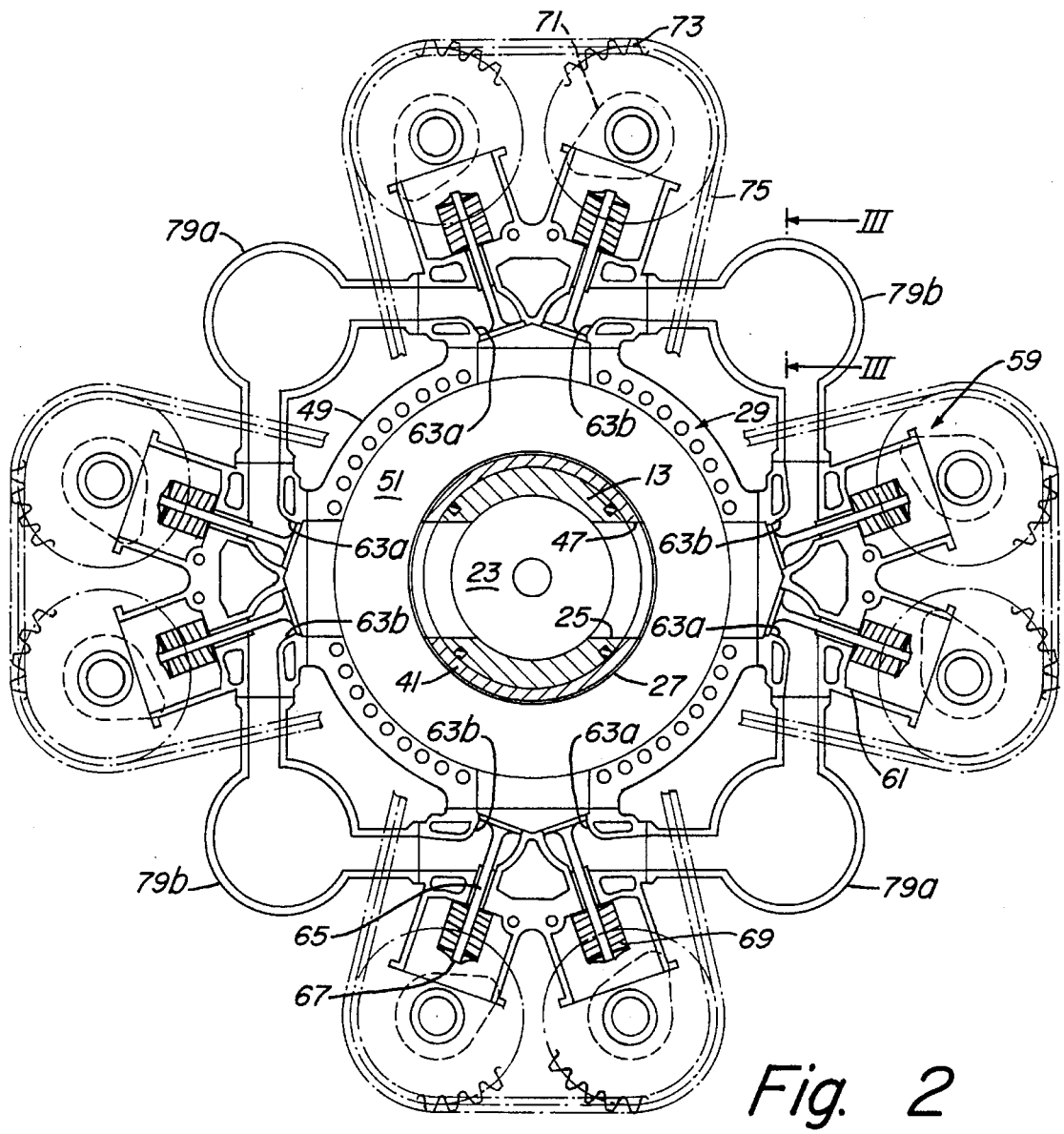
FIG. 2 is another sectional view of the pulse detonation apparatus of FIG. 1, taken along the line II—II and showing an additional valve manifolds that are not shown in FIG. 1.
Figure 4:
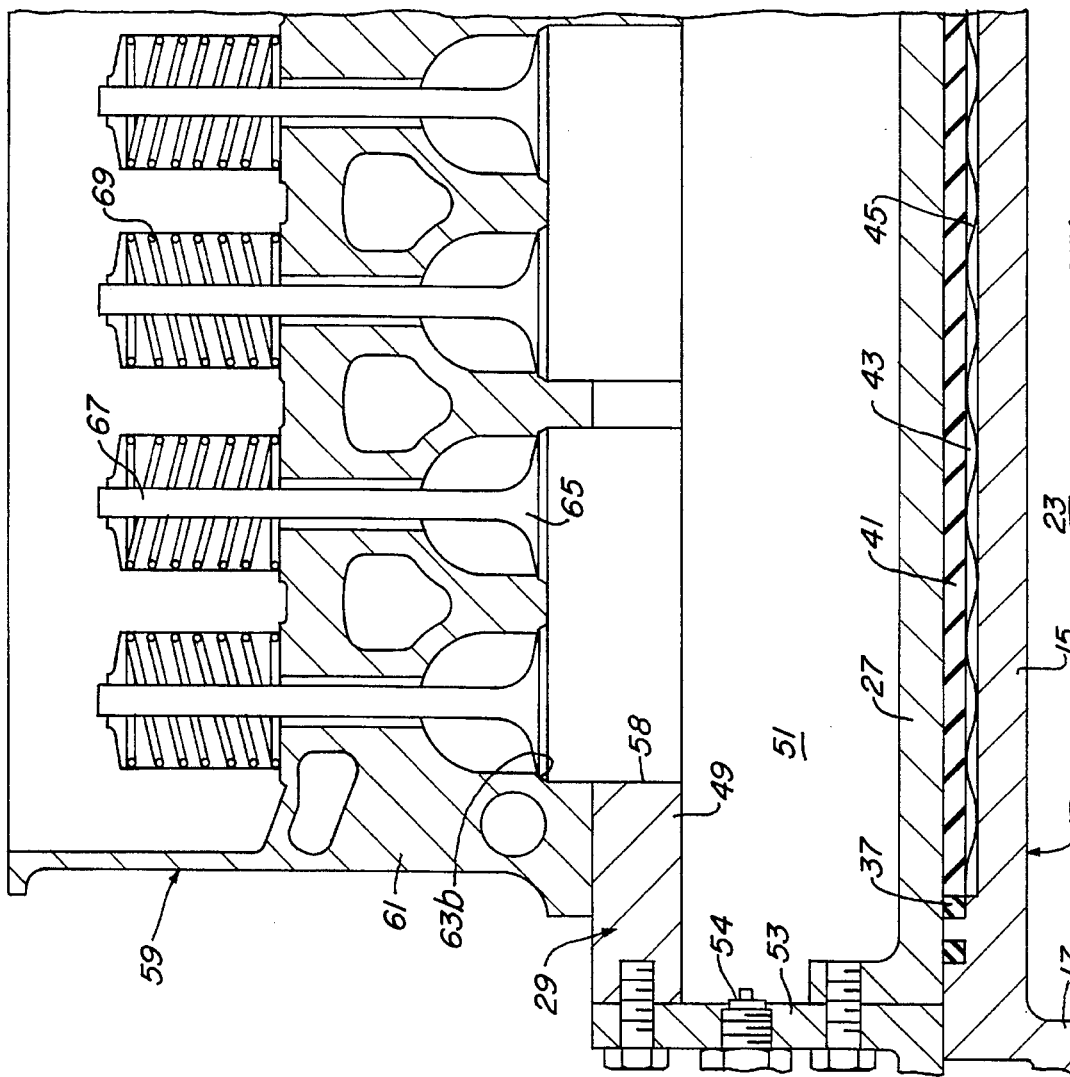
FIG. 4 is an enlarged partial sectional view of a portion of the pulse detonation apparatus of FIG. 1.

As shown in FIGS. 2 and 4, four linear seals 41 serve along with the circular seals 37, 39 to seal core feed cylinder outlet ports 25. Linear seals 41 are spaced about the circumference of core feed cylinder 13, with each of the core feed cylinder outlet ports 25 located between two of the linear seals 41. As shown particularly in FIG. 4, each linear seal 41 is located in a straight groove 43 that is parallel to axis 24 (FIG. 1). A wave spring 45 located in groove 43 urges linear seal 41 radially outward to seal against inner sidewall 27. Preferably, cooling fluid passages (not shown) deliver a cooling fluid to groove 43. Additionally, oil passages (not shown) extend through core feed cylinder 13 for delivering oil to the bearings 31, 33 (FIG. 1) and to the circular seals 37, 39.

The inner sidewall 27 has four detonation chamber ports 47, positioned to register with the outlet ports 25 twice per revolution of core feed cylinder 13. When registered, the purge gas from core feed cylinder 13 flows into the detonation chamber 29. Detonation chamber 29 also has an outer sidewall 49 which is spaced radially outward from inner sidewall 27. This results in detonation cavity 51 for detonations to occur. Detonation cavity 51 has a forward cavity wall 53. One or more igniters 54 such as spark plugs are located in forward wall 53 for creating a spark at the forward end of detonation cavity 51 to ignite an oxygen fuel mixture. Igniters 54 have ignition energies of three to five joules each. Detonation cavity 51 has an open rearward end 55 for discharging detonation waves. Circumferentially spaced apart braces 57 support outer sidewall 49 with inner sidewall 27 and allow the passage of detonation waves out the rearward end 55.

In the preferred embodiment, an external valve means introduces a gaseous fuel into detonation cavity 51. Outer sidewall 49 has a plurality of elongated openings 58. An external valve assembly 59 mounts to each of the openings 58. FIG. 1 shows only one of the valve assemblies 59, while FIG. 2 shows four of the valve assemblies 59 spaced equally around outer sidewall 49. Each of the valve assemblies 59 includes a valve housing 61. Valve housing 61 secures sealingly to opening 58.

As shown in FIG. 2, each valve housing 61 has sixteen valve seats 63a, 63b. There are two valve seats 63a, 63b in a pair spaced adjacent each other in a circumferential direction, and eight of these pairs 63a, 63b in a longitudinal direction. A plurality of valves 65 are carried within each valve housing 61, each engaging one of the seats 63a, 63b. Each valve 65 has a rod 67 that extends upward from valve housing 61. A spring 69 urges each valve 65 to the closed or upper position. Two cams 71 are mounted each valve housing 61, shown in FIG. 2. Each cam 71 has eight lobes (only one shown) for engaging the rods 67 to reciprocate the valves 65. Cams 71 are driven by sprockets 73. Sprockets 73 are driven by chains 75.

Figure 3:
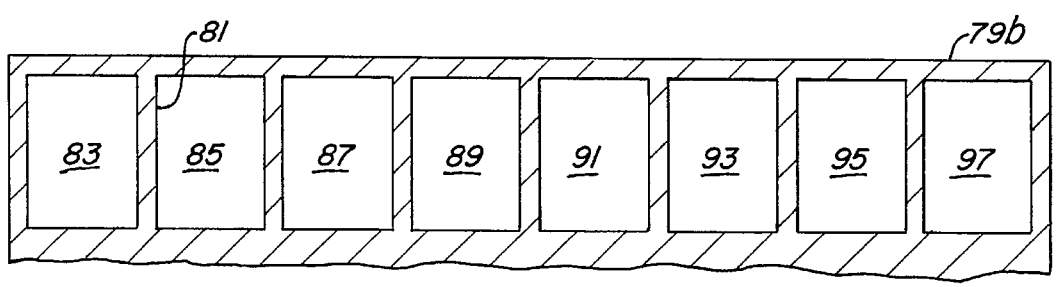
FIG. 3 is a partial sectional view of the pulse detonation apparatus of FIG. 1, taken along the line III—III of FIG. 2.

Preferably, there are two supply manifolds 79a and two supply manifolds 79b, as shown in FIG. 2. Each supply manifold 79a is in communication with the intakes of the valve seats 63a of two adjacent valve housings 61. Each supply manifold 79b is in communication with the intakes of the valve seats 63b of two adjacent valve housings 61. In the embodiment shown in FIG. 3, each of the supply manifolds 79a, 79b is divided by partitions 81 into eight separate sections or intakes 83, 85, 87, 89, 91, 93, 95 and 97. Partitions 81 are equally spaced longitudinally. The most forward intakes 83 of the two manifolds 79b will supply a gaseous fluid only to the most forward valve seats 63b. The most forward intakes 83 of the two manifolds 79a will supply a gaseous fluid only to the most forward valve seats 63a. The other intakes 85, 87, 89, 91, 93, 95 and 97 will supply gaseous fluid only to respective valve seats 63a, 63b located rearward of the most forward valve seats 63a, 63b.

Preferably certain of the intakes 83, 85, 89, 91, 93, 95 and 97 of at least some of the manifolds 79a, 79b are supplied with different gaseous fluids. For example, the most forward intake 83 of at least one of the manifolds 79b may be supplied with a gas having a high oxygen content. Preferably pure oxygen is delivered to the intakes 83 of each of the manifolds 79b, supplying oxygen to the four most forward valve seats 63b. A fuel such as hydrogen may be supplied to intakes 83 of each of the manifolds 79a, supplying fuel to the four most forward valve seats 63a. Timing the cams 71 appropriately results in a high oxygen content fuel at the forward end of annular cavity 51 for detonation. Alternately, the oxygen and fuel may be premixed and supplied to all of the intakes 83 of all four manifolds 79a, 79b.

Preferably, at least some of the more rearward intakes, such as intakes 85, 87, 89, 91, 93, 95 and 97 provide a mixture to detonation cavity 51 having less oxygen content, such as ambient air with fuel. Alternately, ambient air and fuel may be employed only at a few of the more rearward intakes, such as intakes 95 and 97. Some of the intermediate intakes, such as intakes 85, 87, 89 and 91 may provide a mixture of air, additional oxygen, and fuel. The decrease in oxygen content from the forward end to the rearward end may be gradual. This may be accomplished by premixing the fuel with air and differing amounts of oxygen for supplying to intakes 85, 87, 89, and 91. Or, fuel only may be supplied to all of the intakes 85, 87, 89, 91, 93, 95 and 97 of one or both manifolds 79a, while air and varying degrees of oxygen are supplied in varying mixtures to the intakes 85, 87, 89, 91, 93, 95 and 97 of the manifolds 79b.

In this manner, the valve assemblies 59 cause the gaseous fuel near the forward end of detonation cavity 51 to be richer in oxygen content than in a more rearward direction along longitudinal axis 24. This higher oxygen content at the forward end facilitates detonation by the igniter 54 into a detonation wave. The air fuel mixture will continue the propagation of the detonation wave.

In operation, motor 35 will rotate core feed cylinder 13 relative to detonation chamber 29. The rotation speed may vary, but is preferably approximately 2000 rpm. Chains 75 are driven to rotate cams 71. In one example, premixed hydrogen and pure oxygen is supplied to the most forward intakes 83 of the manifolds 79a, 79b. At the same time, premixed hydrogen and air is delivered to the remaining intakes 85, 87, 89, 91, 93, 95 and 97 of the manifolds 79a, 79b. Cams 71 open the valve seats 63a, 63b, causing the delivery of the oxygen rich gaseous fuel into the forward end of detonation cavity 51 and the air fuel mixture into the remaining portion. At the same time that cams 71 open the valve seats 63a, 63b, ports 25, 47 will be out of registry, sealing ambient purge air in core feed cylinder 13 from entering the detonation cavity 51.

Valve seats, 63a, 63b will close due to rotation of cams 71, and core feed cylinder ports 25 will remain closed due to the rotational position of core feed cylinder 13. Then igniter 54 ignites the oxygen fuel mixture, causing an initial detonation wave. The detonation moves at supersonic speeds, propagates with the air fuel mixture, and discharges as a high pressure exhaust out detonator cavity 51. An expansion wave, also referred to herein as a detonation wave, moves forward, reflecting off the forward wall 53 and discharging out the rearward end after the initial detonation wave to create additional thrust. A plug nozzle (not shown) may be attached at the outlet 55 for additional thrust.

After the expansion wave passes from the rearward end 55, the continuous rotation of the core feed cylinder 13 causes the ports 25, 47 to register. The purge air flowing through inlet port 19 flows through the ports 25, 47 and out the detonation cavity 51. The purge air blows the burned gases from the detonation cavity 51. The ports 25 of the rotating core feed cylinder 13 will then rotate out of alignment with the ports 47 and the cycle described above will be repeated.

In one alternate embodiment, rather than a mixture of fuel and air being supplied, the fuel supply could comprises essentially oxygen and fuel. The purge gas could be from an external tank. The apparatus could thus serve as a rocket engine. In another alternate embodiment, purging could be handled by some of the valve assemblies 59 being supplied with a compressed purge gas. In that event, the inlet 19 to the core feed cylinder 13 could be supplied with a fuel supply to augment the fuel supplied by the valve assemblies 59.

The invention has significant advantages. Supplying a richer oxygen near the forward end of the chamber facilitates detonation, which propagates with the less rich mixture as the detonation wave passes through the chamber. Purging the chamber between cycles avoids premature explosions. The annular detonation chamber is more effective for creating a detonation wave than a cylindrical chamber. By mounting the fuel valve assemblies to the exterior sidewall, reciprocating valves of conventional design can be employed. The rotating core feed cylinder provides a ready supply of purge gas, or alternately could augment the fuel supply from the valves.

While the invention has only been shown in one of its form, it should be apparent to those skilled in the art that it is not so limited but is susceptible to various changes without departing from the scope of the invention.

We claim:

1. A pulse detonation apparatus, comprising in combination:

a detonation chamber having a longitudinal axis, an inner sidewall, an outer sidewall spaced radially outward from the inner sidewall, a closed forward end, and an open rearward end, defining an annular detonation cavity;

fuel valve means for introducing into the detonation cavity a discrete gaseous fuel mixture which is richer in oxygen content at the forward end than at the rearward end;

ignition means for detonating the gaseous fuel mixture in the detonation cavity, creating a detonation wave moving toward the rearward end; the apparatus further comprising:

an inner sidewall port in the detonation chamber;

a core feed cylinder carried within the inner sidewall of the detonation chamber, having a forward end, a rearward end, a sidewall, a longitudinal axis, an inlet port extending through the forward end and supplied with a purge gas supply, and an outlet port in the sidewall of the core feed cylinder positioned to register with the inner sidewall port: and rotary drive means for continuously rotating the core feed cylinder to cause the outlet port to register with the inner sidewall port at least once per revolution to admit the purge gas supply from the inlet port to the detonation cavity after each detonation has occurred.

2. A pulse detonation apparatus, comprising in combination:

a detonation chamber having a longitudinal axis, an inner sidewall, an outer sidewall spaced radially outward from the inner sidewall, a closed forward end, and an open rearward end, defining an annular detonation cavity;

fuel valve means for introducing into the detonation cavity a discrete gaseous fuel mixture which is richer in oxygen content at the forward end than at the rearward end;

ignition means for detonating the gaseous fuel mixture in the detonation cavity, creating a detonation wave moving toward the rearward end; wherein the fuel valve means comprises:

a valve housing stationarily mounted to the outer sidewall of the detonation chamber, the valve housing having a valve seat;

a valve carried by the valve housing for reciprocating movement between a closed position against the seat and an open position spaced from the seat; and cam means for moving the valve between the closed and open positions.

3. A pulse detonation apparatus, comprising in combination:

a detonation chamber having a longitudinal axis, an inner sidewall, an outer sidewall spaced radially outward from the inner sidewall, a closed forward end, and an open rearward end, defining an annular detonation cavity;

fuel valve means for introducing into the detonation cavity a discrete gaseous fuel mixture which is richer in oxygen content at the forward end than at the rearward end;

ignition means for detonating the gaseous fuel mixture in the detonation cavity, creating a detonation wave moving toward the rearward end; wherein the fuel valve means comprises:

a first valve and a second valve spaced rearward from the first valve on the outer sidewall of the detonation chamber;

oxygen fuel supply means for delivering to the first valve a mixture of oxygen and fuel having a higher oxygen content than surrounding ambient air; and air fuel supply means for delivering to the second valve a mixture of air and fuel.

4. A pulse detonation apparatus, comprising in combination:

a detonation chamber having a longitudinal axis, an inner sidewall, an outer sidewall spaced radially outward from the inner sidewall, a closed forward end, and an open rearward end, defining an annular detonation cavity;

fuel valve means for introducing into the detonation cavity a discrete gaseous fuel mixture which is richer in oxygen content at the forward end than at the rearward end;

ignition means for detonating the gaseous fuel mixture in the detonation cavity, creating a detonation wave moving toward the rearward end; wherein the fuel valve means comprises:

at least one valve housing mounted to the outer sidewall of the detonation chamber, the valve housing having a plurality of valve seats spaced longitudinally along the longitudinal axis of the detonation chamber;

a plurality of valves carried by the valve housing, each carried for reciprocating movement between a closed position against one of the seats and an open position spaced from the seat;

cam means for moving the valves between the closed and open positions; and fuel supply means connected to the valve housing for supplying a fuel mixture to the valve seats that is richer in oxygen content at least at one of the valve seats nearer the forward end of the detonation chamber than at the valve seats nearer the rearward end.

5. The pulse detonation apparatus according to claim 4 wherein the apparatus further comprises;

means for supplying to at least some of the valve seats a purge gas for purging the detonation chamber of burned gases after the detonation wave has passed from the rearward end and prior to introducing the gaseous fuel mixture for the next cycle.

6. The pulse detonation apparatus according to claim 4 wherein the apparatus further comprises:

an inner sidewall port in the detonation chamber;

a core feed cylinder carried within the inner sidewall of the detonation chamber, having a forward end, a rearward end, a sidewall, a longitudinal axis, an inlet port extending through the forward end and supplied with a purge gas, and an outlet port in the sidewall of the core feed cylinder positioned to register with the inner sidewall port; and rotary drive means for continuously rotating the core feed cylinder to cause the outlet sidewall port to register with the inner sidewall port at least once per revolution to admit the purge gas from the inlet port to the detonation cavity for purging the detonation cavity after the detonation wave passes from the rearward end.

7. A pulse detonation apparatus, comprising in combination:

a core feed cylinder having a longitudinal axis, a forward end, a rearward end, a sidewall, an inlet port extending through the forward end and in communication with a gaseous purge fluid, and an outlet port in the sidewall;

an annular detonation chamber having an inner sidewall that sealingly receives the core feed cylinder, an outer sidewall spaced radially outward from the inner sidewall, a closed forward end and an open rearward end, defining an annular detonation cavity, and an inner sidewall port located in the inner sidewall for registering with the outlet port;

fuel valve means mounted to the detonation chamber for introducing into the detonation cavity a discrete gaseous fuel mixture;

ignition means for detonating the gaseous fuel mixture in the detonation chamber, creating a detonation wave moving toward the rearward end; and rotary drive means for continuously rotating the core feed cylinder to cause the outlet port to register with the inner sidewall port at least once per revolution for introducing the purge fluid from the inlet port into the detonation chamber.

8. The pulse detonation apparatus according to claim 7 wherein the fuel valve means comprises:

a valve housing mounted to the outer sidewall of the detonation chamber, the valve housing having a valve seat;

a valve carried by the valve housing for reciprocating movement between a closed position against the seat and an open position spaced from the seat; and cam means for moving the valve between the closed and open positions.

9. The pulse detonation apparatus according to claim 7 wherein the fuel valve means comprises:

a first valve and a second valve spaced rearward from the first valve;

oxygen fuel supply means for delivering to the first valve a mixture of oxygen and fuel having a higher oxygen content than surrounding ambient air; and air fuel supply means for delivering to the second valve a mixture of air and fuel.

10. The pulse detonation apparatus according to claim 7 wherein the fuel valve means comprises:

a valve housing mounted stationarily to the outer sidewall of the detonation chamber, the valve housing having a plurality of valve seats spaced longitudinally along the longitudinal axis;

a plurality of valves carried by the valve housing, each carried for reciprocating movement between a closed position against one of the seats and an open position spaced from the seat;

cam means for moving the valves between the closed and open positions; and fuel supply means connected to the valve housing for supplying a fuel mixture to the valve seats that is richer in oxygen content at least at one of the valve seats nearer the forward end of the detonation chamber than at the valve seats nearer the rearward end.

11. The pulse detonation apparatus according to claim 7 wherein the gaseous fuel mixture supplied by the fuel valve means consists essentially of oxygen and a fuel, allowing the apparatus to serve as a rocket engine.

12. A pulse detonation apparatus, comprising in combination:

a core feed cylinder having a forward end, a rearward end, a sidewall, a longitudinal axis, an inlet port extending through the forward end and in communication with a purge gas for supplying a purge gas into the core feed cylinder, and an outlet port in the sidewall;

an annular detonation chamber having an inner sidewall that sealingly receives the core feed cylinder, an outer sidewall, a closed forward end and an open rearward end, defining a detonation cavity, and an inner sidewall port located in the inner sidewall for registering with the outlet port of the core feed cylinder;

at least one valve housing mounted stationarily to the outer sidewall of the detonation chamber, the valve housing having a plurality of valve seats spaced longitudinally along the longitudinal axis;

a plurality of valves carried by the valve housing, each carried for reciprocating movement between a closed position against one of the seats and an open position spaced from the seat;

cam means for moving the valves between the closed and open positions;

fuel supply means connected to the valve housing for supplying a gaseous fuel through the valve seats to the detonation cavity that is richer in oxygen content nearer the forward end of the detonation chamber than nearer the rearward end;

ignition means for detonating the gaseous fuel mixture in the detonation chamber, creating a detonation wave moving toward the rearward end; and rotary drive means for continuously rotating the core feed cylinder to cause the outlet port to register with the inner sidewall port at least once per revolution for introducing the purge gas flowing through the inlet port, the core feed cylinder, and the outlet port into the detonation cavity for purging the detonation cavity after the detonation wave passes from the discharge end.

13. The pulse detonation apparatus according to claim 12 wherein the fuel supply means comprises a manifold having a separate intake leading to each of the valve seats.

14. A method of creating a high pressure discharge, comprising:

(a) providing a core feed cylinder having a longitudinal axis, a forward end, a rearward end, a sidewall, an inlet port extending through the forward end, and an outlet port in the sidewall, (b) mounting the core feed cylinder within an annular detonation chamber having an inner sidewall that sealingly and rotatably receives the core feed cylinder, an outer sidewall spaced radially outward from the inner sidewall, a closed forward end and an open rearward end, defining an annular detonation cavity, and an inner sidewall port located in the inner sidewall for registering with the outlet port;

(c) introducing into the detonation chamber a discrete gaseous fuel mixture;

(d) detonating the gaseous fuel mixture in the detonation chamber, creating a detonation wave moving toward and out the rearward end to create thrust; and (e) supply a gaseous purge fluid to the inlet port while rotating the core feed cylinder to cause the outlet port to register with the inner sidewall port at least once per revolution, causing the gaseous purge fluid to flow through the outlet port into the detonation cavity after each detonation.

15. The method according to claim 14 wherein step (c) comprises:

supplying a fuel mixture that is richer in oxygen content nearer the forward end of the detonation cavity than nearer the rearward end.

16. The method according to claim 14 wherein the gaseous fuel mixture introduced consists essentially of oxygen and a fuel.

17. A pulse detonation apparatus, comprising in combination:

a detonation chamber having a longitudinal axis, a cylindrical sidewall, a closed forward end, and an open rearward end;

a plurality of ports in the sidewall spaced longitudinally apart from each other;

fuel supply means for flowing fuel and oxidizer through the ports with a richer oxygen content flowing through the ports nearer the forward end of the detonation chamber than the ports nearer the rearward end;

valve means for opening and closing the ports; and ignition means for detonating the fuel mixture in the detonation chamber when the ports are closed, creating a detonation wave moving toward the rearward end.

18. The apparatus according to claim 17, wherein the valve means comprises:

a plurality of valves mounted exterior of the detonation chamber and spaced longitudinally apart from each other.

19. The apparatus according to claim 17, wherein the sidewall defines an outer periphery of the detonation chamber.

20. The apparatus according to claim 17, further comprising:

an inner cylinder located within the detonation chamber and spaced radially inward from the sidewall, defining an annular configuration for the detonation chamber.

21. A pulse detonation apparatus, comprising in combination:

an inner cylinder having a longitudinal axis, a forward end, a rearward end, a sidewall, an inlet port extending through the forward end and in communication with a supply of gas, and an outlet port in the sidewall;

an annular detonation chamber having an inner sidewall that sealingly receives the sidewall of the inner cylinder, an outer sidewall spaced radially outward from the inner sidewall, a closed forward end and an open rearward end, defining an annular detonation chamber, and an inner sidewall port located in the inner sidewall for registering with the outlet port;

rotary drive means for continuously rotating the inner cylinder to cause the outlet port to register with the inner sidewall port at least once per revolution to cause the gas in the inner cylinder to flow into the detonation chamber; and ignition means for causing a detonation in the detonation chamber when the inlet port is out of registry with the outlet port, creating a detonation wave moving toward the rearward end.

22. A method of creating a high pressure discharge, comprising:

providing a detonation chamber having a sidewall, a closed forward end, an open rearward end, and a longitudinal axis;

providing a plurality of ports in the sidewall spaced longitudinally apart from each other;

flowing fuel and oxidizer through the ports, and providing more oxygen relative to fuel to the ports nearer the forward end than those nearer the rearward end;

opening and closing the ports; and detonating the fuel and the oxidizer in the detonation chamber when ports are closed, creating a detonation wave moving toward the rearward end.

* * * * *